United States Patent
Winzer

(10) Patent No.: US 8,891,976 B2
(45) Date of Patent: Nov. 18, 2014

(54) INTERFEROMETER CONFIGURED FOR SIGNAL PROCESSING IN AN INTERFERENCE PATH

(75) Inventor: Peter Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 574 days.

(21) Appl. No.: 13/235,032

(22) Filed: Sep. 16, 2011

(65) Prior Publication Data

US 2013/0070254 A1 Mar. 21, 2013

(51) Int. Cl.
*H04B 10/00* (2013.01)
*H04J 14/02* (2006.01)
*H04J 14/06* (2006.01)
*H04J 14/04* (2006.01)

(52) U.S. Cl.
CPC ........... *H04J 14/02* (2013.01); *H04J 14/06* (2013.01); *H04J 14/04* (2013.01); *H04J 14/0204* (2013.01); *H04J 14/021* (2013.01); *H04J 14/0206* (2013.01); *H04J 14/0205* (2013.01); *H04J 14/0201* (2013.01); *H04J 14/0276* (2013.01)
USPC .......................................................... 398/201

(58) Field of Classification Search
USPC .................... 398/32, 76, 161, 201
See application file for complete search history.

(56) References Cited

U.S. PATENT DOCUMENTS

| | | | |
|---|---|---|---|
| 7,206,509 B2 * | 4/2007 | Beacken | 398/53 |
| 8,050,564 B2 | 11/2011 | Taylor | |
| 2006/0209307 A1 * | 9/2006 | Kim | 356/500 |

FOREIGN PATENT DOCUMENTS

| | | |
|---|---|---|
| EP | 2 312 770 A1 | 4/2011 |
| JP | 2011 109439 A | 6/2011 |

OTHER PUBLICATIONS

R. Discher et al., "Demonstration of Bit Rate Variable ROADM Functionality on an Optical OFDM Superchannel," OSA/OFC/NFOEC 2010.
R. Dischler, et al., "Interleaving OFDM Signals for Multiple Access With Optical Routing Capability and High Spectral Efficiency," ECOC 2009, Sep. 20-24, 2009, Vienna, Austria.
G. Bosco et al., "On the Performance of Nyquist-WDM Terabit Superchannels Based on PM-BPSK, PM-QPSK, PM-8QAM or PM-16QAM Subcarriers," J. of Lightwave Technology, vol. 29, No. 1, Jan. 1, 2011, pp. 53-61.
J. Li et al., "Experimental Investigation of ROADM Functionality on Optical SCFDM Superchannel," The 16$^{th}$ Opto-Electronics and Communications Conference, OECC 2011, Jul. 4-8, 2011, Kaohsiung, Taiwan, pp. 178-179.
S. Chandrasekhar et al., "Transmission of a 1.2-Tb/s 24-Carrier No-Guard-Interval Coherent OFDM Superchannel over 7200-km of Ultra-Large-Area Fiber," Proc. of ECOC 2009.

(Continued)

*Primary Examiner* — Leslie Pascal
(74) *Attorney, Agent, or Firm* — Wall & Tong LLP

(57) ABSTRACT

An interferometer is provided that includes a first path and a second path. The first path is configured to propagate an electro-magnetic signal at a first wavelength. The second path is configured to convert a portion of the electro-magnetic signal from the first wavelength to a second wavelength for processing and is configured to convert the portion of the electro-magnetic signal from the second wavelength back to the first wavelength for interference with the electro-magnetic signal of the first path. The first wavelength may be an optical wavelength or any other suitable wavelength of the electro-magnetic spectrum. The second wavelength, which is different than the first wavelength, also may be any suitable wavelength of the electro-magnetic spectrum.

22 Claims, 7 Drawing Sheets

(56) References Cited

OTHER PUBLICATIONS

Jan. 2, 2013 International Search Report and the Written Opinion of the International Searching Authority, or the Declaration in PCT/US2012/054741, Alcatel Lucent, Applicant, 12 pages.

Jansen, S L et al: "Coherent Optical 25.8-Gb/s OFDM Transmission Over 4160-km SSMF," Journal of Lightwave Technology, IEEE Service Center, New York, NY, US, vol. 26, No. 1, Jan. 1, 2008, pp. 6-15, XP011202719, ISSN: 0733-8724.

Wei-Ren Peng et al: "Theoretical and Experimental Investigations of Direct-Detected RF-Tone-Assisted Optical OFDM Systems," Journal of Lightwave Technology, IEEE Service Center, New York, NY, US, vol. 27, No. 10, May 15, 2009, pp. 1332-1339, XP01125619, ISSN: 0733-8724.

* cited by examiner

INTERFEROMETER CONFIGURED FOR SIGNAL PROCESSING IN AN INTERFERENCE PATH

TECHNICAL FIELD

The invention relates generally to interferometers and, more specifically but not exclusively, to optical interferometers.

BACKGROUND

The area of optical communications has been successfully using wavelength-division multiplexing (WDM) for years to achieve high per-fiber capacities. A recent advance in the area of optical communications is the use of optical superchannels to achieve high per-wavelength interface rates. An optical superchannel is composed of N subcarriers which form a single cohesive wavelength channel. Optical superchannels are gaining increased attractiveness due to the ability to generate high-speed interface rates using low-speed elements.

SUMMARY

Various deficiencies in the prior art are addressed by embodiments of an interferometer.

In one embodiment, an interferometer includes a first path and a second path. The first path is configured to propagate an electro-magnetic signal at a first wavelength. The second path is configured to convert a portion of the electro-magnetic signal from the first wavelength to a second wavelength for processing and is configured to convert the portion of the electro-magnetic signal from the second wavelength back to the first wavelength for interference with the electro-magnetic signal of the first path. The first wavelength may be an optical wavelength or any other suitable wavelength of the electro-magnetic spectrum. The second wavelength, which is different than the first wavelength, also may be any suitable wavelength of the electro-magnetic spectrum.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, an interferometer configured to use signal processing in at least one of its paths is depicted and described herein, although various other capabilities also may be presented herein.

In one embodiment, the interferometer is configured such that signal processing in at least one path of the interferometer occurs at a wavelength that is different from that of the input signal received at the interferometer and the output signal output from the interferometer.

In one embodiment, the interferometer is configured to include a first path and a second path. The first path is configured to propagate an electro-magnetic signal at a first wavelength. The second path is configured to convert a portion of the electro-magnetic signal from the first wavelength to a second wavelength for processing and is configured to convert the portion of the electro-magnetic signal from the second wavelength back to the first wavelength for interference with the electro-magnetic signal of the first path. The first wavelength may be an optical wavelength or any other suitable wavelength of the electro-magnetic spectrum. The second wavelength, which is different than the first wavelength, also may be any suitable wavelength of the electromagnetic spectrum. In one embodiment, the second wavelength may be at baseband (i.e., such that processing performed in the interference path is electronic processing performed on an electronic signal).

It is noted that, unless stated otherwise, references herein to a wavelength $\lambda_i$ are intended to represent a wavelength range, around wavelength $\lambda_i$, carrying one or more electromagnetic signals.

It is noted that although primarily depicted and described within the context of use of an optoelectronic interferometer within telecommunications systems, embodiments of an interferometer configured to use signal processing in at least one of its paths may be used in various other applications in which interferometers may be used (e.g., optical radar applications, biomedical imaging applications, optical metrology, Terahertz (THz) communications and metrology, and the like). It is further noted that, although primarily depicted and described herein with respect to embodiments in which the interferometer operates in the range of optical frequencies, the interferometer may be configured to operate in any of the frequency ranges of the electro-magnetic spectrum.

Figure 1:
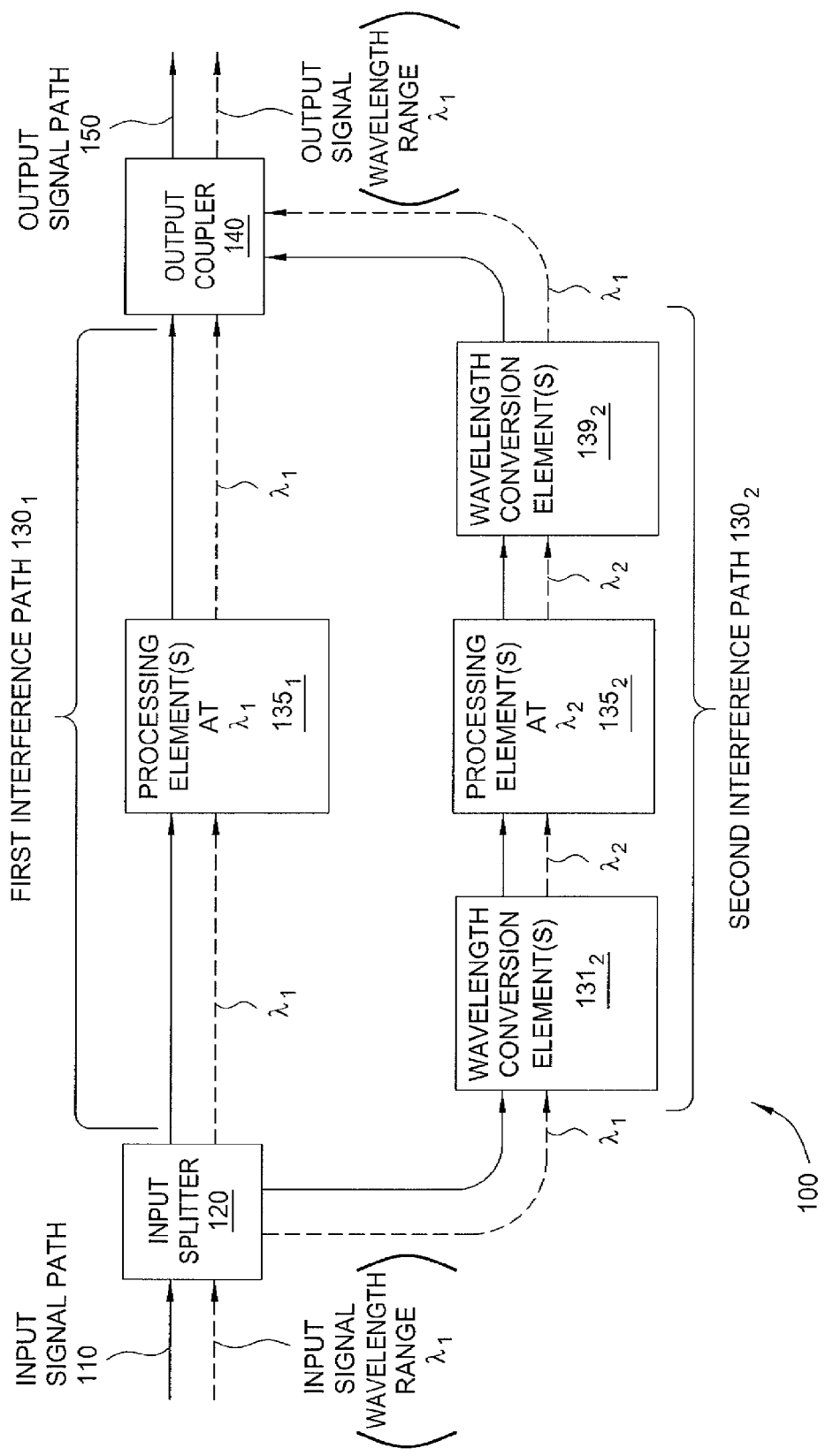
FIG. 1 depicts an exemplary embodiment of an interferometer including two paths, where the interferometer is configured to use signal processing in one of the two paths.

FIG. 1 depicts an exemplary embodiment of an interferometer including two paths, where the interferometer is configured to use signal processing in one of the two paths.

The interferometer 100 includes an input signal path 110, an input splitter 120, a pair of signal paths denoted as interference paths 130 (illustratively, a first interference path $130_1$ and a second interference path $130_2$), an output coupler 140, and an output signal path 150.

The interferometer 100 is configured to support propagation of signals, which may include signals at any suitable wavelength range (e.g., any range of wavelengths of the electro-magnetic spectrum).

The interferometer 100 is configured to receive an input signal via input signal path 110 and provide an output signal via output signal path 150. The received input signal is a signal having a wavelength range denoted as wavelength range $\lambda_1$, and, similarly, the provided output signal is a signal having a wavelength range denoted as wavelength range $\lambda_1$ (i.e., the wavelength range of the input and output signals is the same). It is noted that wavelength range $\lambda_1$ (which also may be referred to more generally herein as wavelength $\lambda_1$)

represents a range of wavelengths, around wavelength $\lambda_1$, carrying one or more electromagnetic signals.

The input splitter 120 is configured to receive the input signal having wavelength range $\lambda_1$ via input signal path 110 and split the input signal having wavelength range $\lambda_1$ such that a first portion of the input signal having wavelength range $\lambda_1$ continues to propagate via first interference path $130_1$ and a second portion of the input signal having wavelength range $\lambda_1$ is propagated to the second interference path $130_2$ for processing. The input splitter 120 may be implemented using any suitable type of splitter, which may depend on the wavelength range $\lambda_1$ of the input signal.

The first interference path $130_1$ is configured to propagate the input signal having wavelength range $\lambda_1$ from the input splitter 120 to the output coupler 140. The first interference path $130_1$ includes one or more processing elements $135_1$ configured to operate at wavelength range $\lambda_1$. The processing element(s) $135_1$ may be configured to perform any suitable type of signal processing. For example, the processing element(s) $135_1$ may include one or more of a delay element configured to impart delay to the input signal having wavelength range $\lambda_1$, a phase adjustment element configured to adjust the phase of the input signal having wavelength range $\lambda_1$, filtering elements operating within the wavelength range $\lambda_1$, and the like, as well as various combinations thereof. The output of processing element(s) $135_1$ is coupled to an input of output coupler 140.

The second interference path $130_2$ is configured to convert the input signal having wavelength range $\lambda_1$ into an intermediate signal having a wavelength range denoted as wavelength range $\lambda_2$ (i.e., different than wavelength range $\lambda_1$), process the intermediate signal having wavelength range $\lambda_2$, and back-convert the intermediate signal having wavelength range $\lambda_2$ into an output signal having wavelength range $\lambda_1$. In other words, the second interference path $130_1$ is configured to process the signal at the wavelength range $\lambda_2$ that is different than the wavelength range $\lambda_1$ of the input signal that is received at interferometer 100 and the output signal that is output from interferometer 100 (which also is the wavelength range at which interference occurs at the output coupler 140). It is noted that wavelength range $\lambda_2$ (which also may be referred to more generally herein as wavelength $\lambda_2$) represents a range of wavelengths, around wavelength $\lambda_2$, carrying one or more electromagnetic signals.

The input/output signals having wavelength range $\lambda_1$ and intermediate signal having wavelength range $\lambda_2$ may be any suitable types of signals in the electro-magnetic spectrum and, thus, the wavelength ranges $\lambda_1$ and $\lambda_2$ may include any suitable wavelength ranges (e.g., any range of wavelengths of the electro-magnetic spectrum). In one embodiment, the wavelength range $\lambda_2$ is at a wavelength of essentially zero meters (i.e., the signal is at a carrier frequency of essentially zero Hertz) such that the intermediate signal is a baseband signal (i.e., electronic signal), exemplary embodiments of which are depicted and described with respect to FIGS. 2-4.

The second interference path $130_2$ includes one or more wavelength conversion elements $131_2$ configured to convert the input signal having wavelength range $\lambda_1$ into the intermediate signal having wavelength range $\lambda_2$, one or more processing elements $135_2$ configured to operate at wavelength range $\lambda_2$ (and, thus, to perform processing of the intermediate signal at the wavelength range $\lambda_2$), and one or more wavelength conversion elements $139_2$ configured to back-convert the intermediate signal having wavelength range $\lambda_2$ into an output signal having wavelength range $\lambda_1$.

The processing element(s) $135_2$ may be configured to perform any suitable type of signal processing, which may depend, at least in part, on the application for which interferometer 100 is being used, the type of signals for which the interferometer 100 is being used, and the like, as well as various combinations thereof. For example, the processing element(s) $135_2$ may be configured to perform signal grooming. For example, the processing element(s) $135_2$ may include one or more of a delay element configured to impart delay to the input signal having wavelength range $\lambda_2$, a phase adjustment element configured to adjust the phase of the input signal having wavelength range $\lambda_2$, a filtering element operating within wavelength range $\lambda_2$, and the like, as well as various combinations thereof. The processing element(s) $135_2$ may be configured to perform various other types of signal processing (e.g., analog or digital, linear or nonlinear, and the like, as well as various combinations thereof).

The wavelength conversion element(s) $131_2$ and the wavelength conversion element(s) $139_2$ may be configured to perform any suitable type of wavelength conversions, which depend at least in part on the type of signals (e.g., wavelength ranges $\lambda_1$ and $\lambda_2$) for which the interferometer 100 is being used. In one embodiment, for example, in which wavelength range $\lambda_2$ is a wavelength of essentially zero meters (i.e., the signal is at a carrier frequency of essentially zero Hertz) such that the intermediate signal is a baseband signal (i.e., electronic signal), wavelength conversion element(s) $131_2$ may be implemented as a $\lambda_2$-to-electronic conversion element (e.g., an optical-to-electrical conversion element where $\lambda_2$ is an optical signal) and the wavelength conversion element(s) $139_2$ may be implemented as a electronic-to-$\lambda_2$ conversion element (e.g., an electrical-to-optical conversion element where $\lambda_2$ is an optical signal). In one such embodiment, for example, interferometer 100 may be considered to be an optoelectronic interferometer having an optical signal path (e.g., which corresponds to first interference path $130_1$) and an optoelectronic signal path (e.g., which corresponds to second interference path $130_2$), embodiments of which are depicted and described with respect to FIGS. 2-4. The output of the wavelength conversion element(s) $139_2$ is coupled to an input of output coupler 140.

The output coupler 140 is configured to receive the input signal having wavelength range $\lambda_1$ that is propagating via first interference path $130_1$ and the output signal having wavelength range $\lambda_1$ that is provided by the second interference path $130_2$, and to combine the received signals (which includes destructive interference and, optionally, constructive addition) to form thereby the output signal having wavelength range $\lambda_1$ which then propagates via the output signal path 150.

Although depicted and described with respect to an embodiment of an interferometer having a specific number of interference paths (illustratively, two interference paths), it will be appreciated that an interferometer may include any suitable number of interference paths which may include two or more interference paths). Similarly, although depicted and described with respect to an embodiment of an interferometer having a specific number of interference paths in which signal processing is performed (illustratively, one of the interference paths), it will be appreciated that an interferometer may include any suitable number of interference paths in which signal processing is performed (e.g., one or more of the interference paths of an interferometer).

Figure 2:
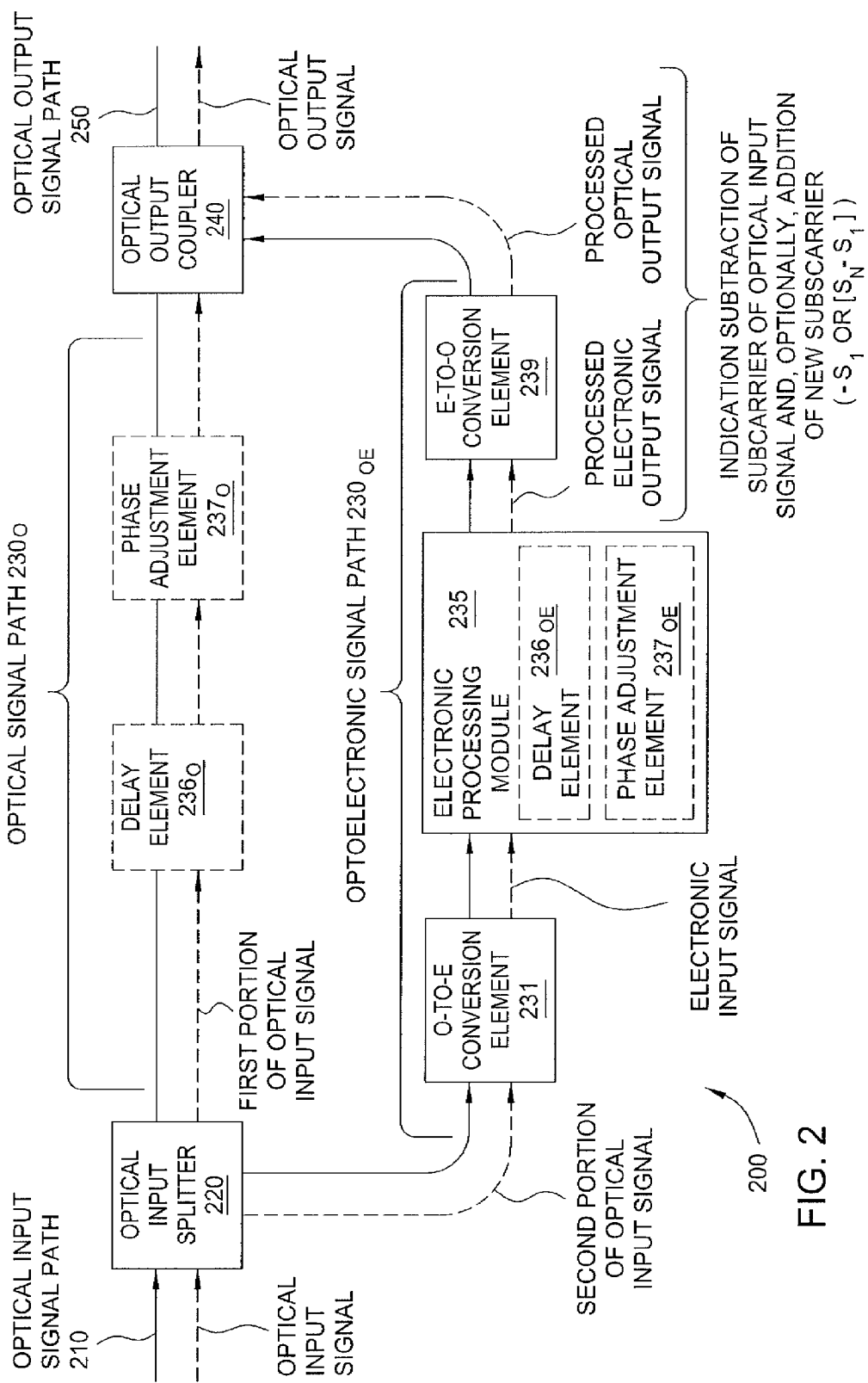
FIG. 2 depicts an exemplary embodiment of an optoelectronic interferometer.

FIG. 2 depicts an exemplary embodiment of an optoelectronic interferometer.

The optoelectronic interferometer 200 includes an optical input signal path 210, an optical input splitter 220, a pair of interference paths 230 (including an optical signal path $230_O$ and an optoelectronic signal path $230_{OE}$), an optical output coupler 240, and an optical output signal path 250. Although depicted and described as having two interference paths, it will be appreciated that optoelectronic interferometer 200 may include more than two interference paths.

The optoelectronic interferometer 200 is configured to support propagation of optical signals, which may include any suitable types of optical signals. In one embodiment, for example, the optical signals are optical superchannels, where an optical superchannel is a single cohesive single-wavelength channel composed of a plurality of subcarriers (e.g., denoted as N subcarriers). For example, optoelectronic interferometer 200 may be configured to support optical superchannels in which the spectra of the subcarriers include negligible overlap (e.g., Nyquist—Wavelength Division Multiplexing (WDM) superchannels and the like), optical superchannels in which the spectra of the subcarriers include at least some overlap (e.g., Orthogonal Frequency Division Multiplexing (OFDM) superchannels, Offset—Quadrature Amplitude Modulation (Offset-QAM), and the like), and the like.

The optoelectronic interferometer 200 is configured to receive an optical input signal via optical input signal path 210 and provide an optical output signal via optical output signal path 250.

The optical input splitter 220 is configured to receive the optical input signal via optical input signal path 210 and split the optical input signal such that a first portion of the optical input signal continues to propagate via optical signal path $230_O$ and a second portion of the optical input signal is propagated to the optoelectronic signal path $230_{OE}$ for processing. The optical input splitter 220 may be implemented using any suitable type of optical splitter.

The optical path $230_O$ is configured to propagate the optical input signal from the optical input splitter 220 to the optical output coupler 240.

The optoelectronic signal path $230_{OE}$ is configured to process the optical input signal to form the processed optical output signal which is then provided to optical output coupler 240. The optoelectronic signal path $230_{OE}$ includes an optical-to-electrical (O-to-E) conversion element 231, an electronic processing module (EPM) 235, and an electronic-to-optical (E-to-O) conversion element 239.

The optical output coupler 240 is configured to receive the optical input signal propagating via optical signal path $230_O$ and a processed optical output signal received via the optoelectronic signal path $230_{OE}$, and to combine the optical input signal and the processed optical output signal to form thereby the output optical signal which then propagates via optical output signal path 250.

As noted above, the optical path $230_O$ is configured to propagate the optical input signal from the optical input splitter 220 to the optical output coupler 240.

In one embodiment, the optical signal path $230_O$ includes a delay element $236_O$ configured to impart delay to the signal that is propagating via the optical signal path $230_O$. The delay element $236_O$ imparts a delay such that the optical input signal propagating via the optical signal path $230_O$ is substantially temporally aligned with the optical output signal received at optical output coupler 240 via optoelectronic signal path $230_{OE}$. The delay element $236_O$ may be a static delay element or a dynamically controllable delay element. In one embodiment, in which the delay element $236_{OE}$ is a static delay element, the delay element $236_{OE}$ imparts a delay that is equal to or greater than the maximum expected propagation delay associated with optoelectronic signal path $230_{OE}$, thereby allowing time for processing to occur in the optoelectronic signal path $230_{OE}$ while also ensuring that the optical input signal propagating via the optical signal path $230_O$ is temporally aligned with the optical output signal received at optical output coupler 240 via optoelectronic signal path $230_{OE}$. The delay element $236_O$ may be any element suitable for delaying an optical signal (e.g., additional optical fiber and the like). Although primarily depicted and described herein with respect to use of a single delay element within optical signal path $230_O$ (namely, delay element $236_O$), it will be appreciated that any suitable number of delay elements may be disposed within optical signal path $230_O$ at any suitable locations within optical signal path $230_O$ (i.e., before O-to-E conversion element 231 or after E-to-O conversion element 239).

In one embodiment, the optical signal path $230_O$ includes a phase adjustment element $237_O$ configured to perform phase adjustments on the optical signal that is propagating via the optical signal path $230_O$. In one embodiment, the phase adjustment element $237_O$ adjusts the phase such that the optical input signal propagating via the optical signal path $230_O$ has the same phase as (or at least a phase substantially similar to) the optical output signal received at optical output coupler 240 via optoelectronic signal path $230_{OE}$. In one embodiment, the phase adjustment element $237_O$ is configured for use in setting a specific phase relationship (e.g., differing from 0 or 180 degrees). The phase adjustment element $237_O$ may be a static phase adjustment element or a dynamically controllable phase adjustment element. In one embodiment, in which phase adjustment element $237_O$ is a dynamically controllable phase adjustment element, the phase adjustments made by phase adjustment element $237_O$ may be controlled, using a control signal from a control detector (which may form part of optoelectronic interferometer 200 or may be used in conjunction with optoelectronic interferometer 200, but which is omitted from FIG. 2 for purposes of clarity), where the control detector is configured to (1) use pilot subcarriers in an OFDM aggregate signal, (2) use temporal pilot symbols, or (3) feed the detected optical output signal back into the EPM 235 for comparison with an expected optical output signal at that point while adjusting the phase of the optical input signal propagating via the optical signal path $230_O$ to drive an error signal toward zero. Although primarily depicted and described herein with respect to use of a single phase adjustment element within optical signal path $230_O$ (namely, phase adjustment element $237_O$), it will be appreciated that any suitable number of phase adjustment elements may be disposed within optical signal path $230_O$ at any suitable locations within optical signal path $230_O$.

As noted above, the optoelectronic signal path $230_{OE}$ is configured to process the optical input signal to form the processed optical output signal which is then provided to optical output coupler 240.

In one embodiment, in which the optical input signal includes a plurality of subcarriers, the optoelectronic signal path $230_{OE}$ is configured to process the optical input signal such that the resulting processed optical output signal indicates subtraction of one of the subcarriers of the optical input signal. As a result, the combination, within the optical output coupler 240, of the optical input signal propagating via optical signal path $230_O$ (which still includes the one of the subcarriers) and the processed optical output signal received via optoelectronic signal path $230_{OE}$ (which indicates subtraction of the one of the subcarriers) results in destructive interference with respect to that subcarrier such that the subcarrier is effectively removed from the optical input signal. This creates an available slot within the portion of the optical input signal in which that subcarrier was previously propagating prior to its removal via the destructive interference. In other words, in the optical output signal, the one of the subcarriers of the optical input signal is replaced with an available slot into which a new subcarrier may be added. It is noted that the new subcarrier may be added at the optoelectronic interferometer 200 or downstream of the optoelectronic interferometer 200 (e.g., by another node in a network in which the optoelectronic interferometer 200 is deployed).

In one embodiment, in which the optical input signal includes a plurality of subcarriers, the optoelectronic signal path $230_{OE}$ is configured to process the optical input signal such that the resulting processed optical output signal indicates subtraction of one of the subcarriers of the optical input signal and addition of a new subcarrier. As a result, the combination, within the optical output coupler 240, of the optical input signal propagating via optical signal path $230_O$ (which still includes the one of the subcarriers) and the processed optical output signal received via optoelectronic signal path $230_{OE}$ (which indicates subtraction of the one of the subcarriers and addition of a new subcarrier) results in (1) destructive interference with respect to the one of the subcarriers such that the one of the subcarriers is effectively removed from the optical input signal and (2) addition of the new subcarrier within the available slot that is created within the portion of the optical input signal in which the one of the subcarriers was previously propagating prior to its removal via the destructive interference. In other words, in the optical output signal, the one of the subcarriers of the optical input signal is replaced with the new subcarrier.

The optoelectronic signal path $230_{OE}$ is configured to perform signal processing in baseband using O-to-E conversion element 231, EPM 235, and E-to-O conversion element 239.

The O-to-E conversion element 231 is configured to receive a portion of the optical input signal from optical input splitter 220 and convert the optical input signal into an electronic input signal which is then provided to an input of the EPM 235. The O-to-E conversion element 231 may be implemented using any suitable type of O-to-E conversion element. In one embodiment, for example, the O-to-E conversion element 231 may be a 90-degree optical hybrid and coherent receiver.

The EPM 235 is configured to receive the electronic input signal from O-to-E conversion element 231. The EPM 235 is configured to process the electronic input signal to produce an associated processed electronic output signal. As described herein, the processed electronic output signal produced by EPM 235 includes an indication of subtraction of one of the subcarriers of the optical input signal received via optical input signal path 210 and, optionally, also may include an indication of a new subcarrier to be added to the optical input signal. The EPM 235 also may be configured to perform drop and/or add functions for dropping data from the optical input signal received via optical input signal path 210 (e.g., dropping one of the subcarriers of the optical input signal received via optical input signal path 210 via a data drop interface of the optoelectronic interferometer 200) and/or adding data to the optical input signal received via optical input signal path 210 (e.g., adding a new subcarrier to the optical input signal received via optical input signal path 210 via a data add interface of the optoelectronic interferometer 200). The EPM 235 is configured to provide the processed electronic output signal to the E-to-O conversion element 239. The EPM 235 may be implemented using any suitable type of processing element (e.g., an analog processing element, a digital processing element, and the like, as well as various combinations thereof).

In one embodiment, for example, the EPM 235 may be implemented using a Digital Signal Processor (DSP). It will be appreciated that such a DSP may be implemented in any suitable manner. In one embodiment, for example, DSP 235 may be implemented in a general purpose computer or a special purpose computer. In one embodiment, for example, DSP 235 may include or cooperate with one or more processors, memory, input-output circuitry, communication buses, support circuitry, and the like, for receiving, processing, and/or providing information. It is noted that the at least one processor may be any conventional processor for executing programs stored in memory. It is noted that the memory may be any conventional volatile memory (e.g., RAM, DRAM, among others), non-volatile memory (e.g., disk drives, floppy drives, CDROM, EPROMS, among other computer readable medium) or any other memory device for storing data and various control programs, such as methodology according to the present invention. It is noted that the processor may cooperate with conventional support circuitry, such as power supplies, clock circuits, cache memory and the like, as well as circuits that assist in executing the various programs and routines, as well as other programs and data. As such, it is contemplated that some of the functions discussed herein as software processes may be implemented within hardware, for example, as circuitry that cooperates with the processor to perform various steps. It is noted that various embodiments of DSP 235 may be implemented in hardware such as, for example, an application specific integrated circuit (ASIC) or a field-programmable gate array (FPGA). As such, it is intended that the functions described herein in conjunction with DSP 235 be broadly interpreted as being equivalently performed by software, hardware, or a combination thereof.

The E-to-O conversion element 239 is configured to receive the processed electronic output signal from EPM 235 and convert the processed electronic output signal into a processed optical output signal which is then provided to an input of the optical output coupler 240. The E-to-O conversion element 239 may be implemented using any suitable type of E-to-O conversion element. In one embodiment, for example, the E-to-O conversion element 239 may be an I/Q modulator.

As noted above, the optical output coupler 240 is configured to receive the optical input signal propagating via optical signal path $230_O$ and the processed optical output signal received via the optoelectronic signal path $230_{OE}$, and to combine the optical input signal and the processed optical output signal to form thereby the output optical signal which then propagates via optical output signal path 250. The optical input signal propagating via optical signal path $230_O$ includes the subcarrier to be removed from the optical input signal and the processed optical output signal received via the optoelectronic signal path $230_{OE}$ includes an indication of subtraction of the subcarrier to be removed from the optical input signal, such that interaction of the two signals within optical output coupler 240 results in removal of that subcarrier from the optical input signal via destructive interference between the two signals (which also may be referred to as optical subtraction). The processed optical output signal received via the optoelectronic signal path $230_{OE}$ optionally includes an indication of addition of a new subcarrier such that interaction of the two signals within optical output coupler 240 results in addition of that new subcarrier to the optical input signal (which also may be referred to as optical addition). The resulting optical output signal (with the subcarrier removed and, optionally, including the new subcarrier) is output from optical output coupler 240 and propagates via optical output signal path 250. It is noted that the interaction between the signals at optical output coupler 240 may be improved through use of one or more delay elements and/or one or more phase adjustment elements.

In one embodiment, the optoelectronic signal path $230_{OE}$ includes a delay element $236_{OE}$ configured to impart delay to the signal that is propagating via the optoelectronic signal path $230_{OE}$. The delay element $236_{OE}$ imparts a delay such that the optical input signal propagating via the optical signal path $230_O$ is substantially temporally aligned with the optical output signal received at optical output coupler 240 via optoelectronic signal path $230_{OE}$. In one embodiment, the delay element $236_{OE}$ is provided as part of EPM 235 (although it will be appreciated that the delay element $236_{OE}$ may be disposed at any suitable location within optoelectronic signal path $230_{OE}$). The delay element $236_{OE}$ may be a static delay element or a dynamically controllable delay element. In one embodiment, in which delay element $236_{OE}$ is a dynamically controllable delay element, the amount of delay imparted by delay element $236_{OE}$ may be controlled in any suitable manner. In one embodiment, for example, in which delay element $236_{OE}$ is a dynamically controllable delay element, the amount of delay imparted by delay element $236_{OE}$ may be controlled by using a control detector (which may form part of the optoelectronic interferometer 200 or be may be used in conjunction with the optoelectronic interferometer 200, but which is omitted from FIG. 2 for purposes of clarity), to measure the optical output signal and impart a delay for ensuring that the optical input signal propagating via the optical signal path $230_O$ is temporally aligned with the optical output signal received at optical output coupler 240 via optoelectronic signal path $230_{OE}$. Although primarily depicted and described herein with respect to use of a single delay element within optoelectronic signal path $230_{OE}$ (namely, delay element $236_{OE}$), it will be appreciated that any suitable number of delay elements may be disposed within optoelectronic signal path $230_{OE}$ at any suitable locations within optoelectronic signal path $230_{OE}$, including placement in the optical domain (i.e., before O-to-E conversion element 231 or after E-to-O conversion element 239).

It is noted that in embodiments in which optical signal path $230_O$ includes a delay element $236_O$ and optoelectronic signal path $230_{OE}$ includes a delay element $236_{OE}$, the delay elements 236 may be used in combination to ensure that the optical input signal propagating via the optical signal path $230_O$ is temporally aligned with the optical output signal received at optical output coupler 240 via optoelectronic signal path $230_{OE}$. It is further noted that one or more control detectors and/or other control elements may be used to control the delay elements 236.

In one embodiment, the optoelectronic signal path $230_{OE}$ includes a phase adjustment element $237_{OE}$ configured to perform phase adjustments on the signal that is propagating via the optoelectronic signal path $230_{OE}$. In one embodiment, the phase adjustment element $237_{OE}$ adjusts the phase such that the optical input signal propagating via the optical signal path $230_O$ has the same phase as (or at least a phase substantially similar to) the optical output signal received at optical output coupler 240 via optoelectronic signal path $230_{OE}$. In one embodiment, the phase adjustment element $237_{OE}$ is configured for use in setting a specific phase relationship (e.g., differing from 0 or 180 degrees). In one embodiment, the phase adjustment element $237_{OE}$ is provided as part of EPM 235 (although it will be appreciated that the phase adjustment element $237_{OE}$ may be disposed at any suitable location within optoelectronic signal path $230_{OE}$). The phase adjustment element $237_{OE}$ may be a static phase adjustment element or a dynamically controllable phase adjustment element. In one embodiment, in which phase adjustment element $237_{OE}$ is a dynamically controllable phase adjustment element, the phase adjustments made by phase adjustment element $237_{OE}$ may be controlled using a control signal from a control detector (which may form part of optoelectronic interferometer 200 or be may be used in conjunction with optoelectronic interferometer 200, but which is omitted from FIG. 2 for purposes of clarity), where the control detector is configured to (1) use pilot subcarriers in an OFDM aggregate signal, (2) use temporal pilot symbols, or (3) feed the detected optical output signal back into the EPM 235 for comparison with an expected optical output signal at that point while adjusting the phase of the optical input signal propagating via the optical signal path $230_O$ to drive an error signal toward zero. Although primarily depicted and described herein with respect to use of a single phase adjustment element within optoelectronic signal path $230_{OE}$ (namely, phase adjustment element $237_{OE}$), it will be appreciated that any suitable number of phase adjustment elements may be disposed within optoelectronic signal path $230_{OE}$ at any suitable locations within optoelectronic signal path $230_{OE}$.

It is noted that in embodiments in which optical signal path $230_O$ includes a phase adjustment element $237_O$ and optoelectronic signal path $230_{OE}$ includes a phase adjustment element $237_{OE}$, the phase adjustment elements 237 may be used in combination to ensure that the optical input signal propagating via the optical signal path $230_O$ has the same phase as the optical output signal received at optical output coupler 240 via optoelectronic signal path $230_{OE}$. It is further noted that one or more control detectors and/or other control elements may be used to control the phase adjustment elements 237.

Although omitted for purposes of clarity, it is noted that one or more other elements may form part of the optoelectronic interferometer 200 and/or may be used in conjunction with the optoelectronic interferometer 200 for controlling removal of subcarriers from the optical input signal and, optionally, for controlling addition of subcarriers to the optical input signal.

In one embodiment, for example, a local oscillator may be used to control the frequency of the subcarrier that is removed from the optical input signal by the optoelectronic signal path $230_{OE}$. The local oscillator may be implemented in any suitable manner (e.g., using a tunable laser or other suitable device). For example, to support subtraction of a subcarrier having a subcarrier frequency $f_C$, the local oscillator may tune to a frequency ($f_{LO}$) approximately matching the subcarrier frequency $f_C$ (i.e., ($f_{LO} \approx f_C$). In this example, the beat frequency between the subcarrier and the local oscillator is $\Delta f = f_C - f_{LO}$.

In one embodiment, for example, a transmit laser may be used to control the frequency of the new subcarrier that is added to the optical input signal by the optoelectronic signal path $230_{OE}$. The transmit laser may be implemented in any suitable manner (e.g., using a tunable laser or other suitable device). For example, to support addition of a new subcarrier having a subcarrier frequency $f_C$, the transmit laser may tune to the subcarrier frequency $f_C$ to be used.

In one embodiment, a single device (e.g., tunable laser) may be used as both the local oscillator and the transmit laser, thereby enabling the new subcarrier to be added at the same location (i.e., subcarrier frequency $f_C$) as the subcarrier removed from the optical input signal. In this embodiment, the new subcarrier is modulated to a carrier frequency of $\Delta f$ before leaving the EPM 235.

In one embodiment, for example, an optical attenuator may be used to equalize the power of the subcarrier being removed from the optical input signal and the optical power of the new subcarrier, thereby improving the efficiency of the destructive interference that takes place within coupler 240 of optoelectronic interferometer 200.

Although primarily depicted and described herein as having two signal paths (illustratively, optical signal path 230$_O$ and optoelectronic signal path 230$_{OE}$), it is noted that optoelectronic interferometer 200 may include any suitable number of signal paths, which include one or more optical signal paths similar to optical signal path 230$_O$ and one or more optoelectronic signal paths similar to optoelectronic signal path 230$_{OE}$.

As described herein, the optoelectronic interferometer 200 may be used in various types of applications, such as in applications in which optical frequencies are used (e.g., in optical telecommunications applications, optical radar applications, optical metrology applications, biomedical imaging applications, and the like) or any other suitable applications of interferometers which may operate in any of the frequency ranges of the electro-magnetic spectrum.

Figure 3:
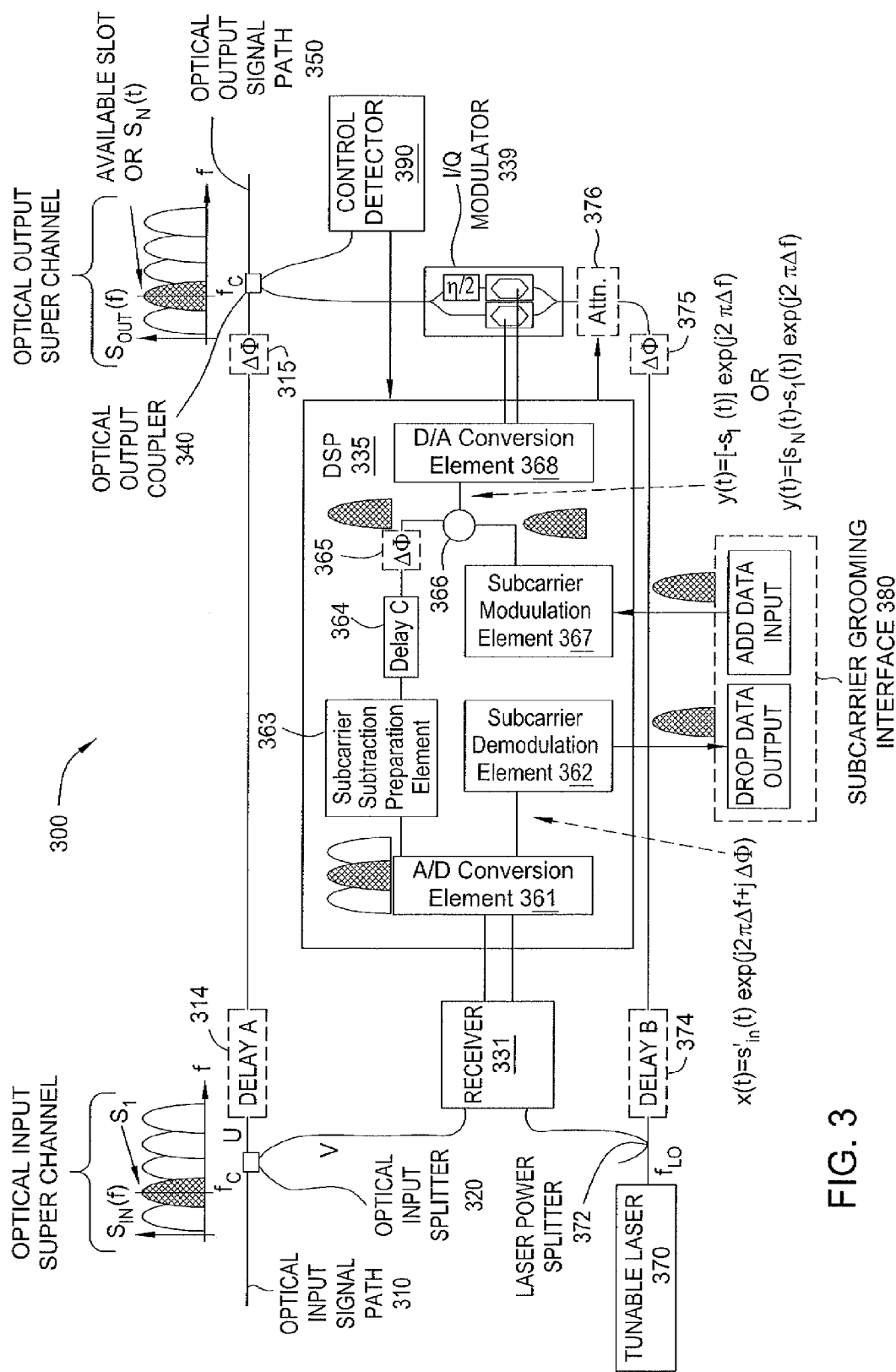
FIG. 3 depicts an exemplary subcarrier grooming apparatus, using an optoelectronic interferometer as depicted in FIG. 2, configured to support single-polarization optical signals.

In order to provide a better understanding of various embodiments of the optoelectronic interferometer 200, an exemplary embodiment illustrating use of optoelectronic interferometer 200 in a subcarrier grooming apparatus is depicted and described with respect to FIG. 3.

FIG. 3 depicts an exemplary subcarrier grooming apparatus, using an optoelectronic interferometer as depicted in FIG. 2, configured to support single polarization optical signals.

As depicted in FIG. 3, portions of the subcarrier grooming apparatus 300 are similar to portions of the optoelectronic interferometer 200.

For example, subcarrier grooming apparatus 300 includes: (a) an optical input signal path 310 which corresponds to optical input signal path 210 of optoelectronic interferometer 200, (b) an optical input splitter 320 which corresponds to optical input splitter 220 of optoelectronic interferometer 200, (c) an optical signal path 330$_O$ which corresponds to optical signal path 230$_O$ of optoelectronic interferometer 200, (d) an optoelectronic signal path 330$_{OE}$ which corresponds to optoelectronic signal path 230$_{OE}$ of optoelectronic interferometer 200, (e) an optical output coupler 340 which corresponds to optical output coupler 240 of optoelectronic interferometer 200, and (f) an optical output signal path 350 which corresponds to optical output signal path 250 of optoelectronic interferometer 200.

Similarly, for example, the optoelectronic signal path 330$_{OE}$ includes: (a) a receiver 331 which corresponds to and is an exemplary implementation of O-to-E conversion element 231 of optoelectronic interferometer 200, (b) a Digital Signal Processor (DSP) 335 which corresponds to and is an exemplary implementation of EPM 232 of optoelectronic interferometer 200, and (c) an I/Q modulator 339 which corresponds to and is an exemplary implementation of E-to-O conversion element 239 of optoelectronic interferometer 200.

The DSP 335 is configured to receive the electronic input signal from receiver 331, process the electronic input signal to produce an associated processed electronic output signal (e.g., including an indication of subtraction of one of the subcarriers of the optical input signal received via optical input signal path 210 and, optionally, including an indication of a new subcarrier to be added to the optical input signal), and provide the processed electronic output signal to the I/Q modulator 339. The DSP 335 may be implemented in any suitable manner. In one embodiment, as depicted in FIG. 3, DSP 335 includes an analog-to-digital (A/D) conversion element 361, a subcarrier demodulation element 362, a subcarrier subtraction preparation element 363, a delay element 364, a phase adjustment element 365, an electrical output coupler 366, a subcarrier modulation element 367, and a digital-to-analog (D/A) conversion element 368. It is noted that one or more of these elements may be optional as further described herein.

As further depicted in FIG. 3, subcarrier grooming apparatus 300 also includes additional elements described as being part of or at least used in conjunction with optoelectronic interferometer 200. For example, subcarrier grooming apparatus 300 also includes a tunable laser 370, a subcarrier grooming interface 380, and a control detector 390. The tunable laser 370 is configured to generate an optical laser signal for (1) use by receiver 331 in dialing to a subcarrier frequency of the subcarrier to be removed from the optical input signal and (2) use by I/Q modulator 339, when applicable, for inserting a new subcarrier to the optical input signal in place of the subcarrier to be removed from the optical input signal. The subcarrier grooming interface 380 is configured to support dropping of data from the input optical signal at subcarrier grooming apparatus 300 and adding of data to the input optical signal at subcarrier grooming apparatus 300. The control detector 390 is configured to provide various control functions in support of removal of subcarriers from the optical input signals and addition of new subcarriers to the optical input signals.

An optical input superchannel (denoted as $s_{in}(t)$, or $S_{in}(f)$ in the frequency domain) enters subcarrier grooming apparatus 300 via the optical input signal path 310. The optical input superchannel $S_{in}(f)$ is depicted as being a Nyquist-WDM comb-type signal, however, it will be appreciated that subcarrier grooming apparatus 300 may perform subcarrier grooming on any suitable type of optical input superchannel, as well as on any other type of WDM optical multiplex. The optical input superchannel $S_{in}(f)$ includes five subcarriers denoted as $S_0(f)$, $S_1(f)$, $S_2(f)$, $S_3(f)$, and $S_4(f)$ where subcarrier $S_1(f)$ (highlighted in FIG. 3) is the subcarrier targeted for removal from optical input superchannel $S_{in}(f)$. It will be appreciated that the use of five subcarriers is merely exemplary, and that optical input superchannel $S_{in}(f)$ may include any suitable number of subcarriers. Similarly, it will be appreciated that removal of subcarrier $S_1(f)$ is merely exemplary, and that any suitable subcarrier(s) may be targeted for removal from optical input superchannel $S_{in}(f)$.

The optical input superchannel $S_{in}(f)$ is received by optical input splitter 320, which splits the power of the optical input superchannel $S_{in}(f)$ such that a first portion of the optical input superchannel $S_{in}(f)$ continues to propagate via the optical signal path 330$_O$ (denoted as U) while a second portion of the optical input superchannel $S_{in}(f)$ is directed to the optoelectronic signal path 330$_{OE}$ (denoted as V).

The receiver 331 receives and detects the second portion of the optical input superchannel $S_{in}(f)$ that is directed to optoelectronic signal path 330$_{OE}$. The receiver 331 also receives a local oscillator input signal, which is a portion of an optical transmit signal generated by tunable laser 370 and split by a laser power splitter 372 configured to receive the optical transmit signal generated by tunable laser 370. The tunable laser 370 dials to a frequency $f_{LO}$ approximately matching the subcarrier frequency $f_C$ of the subcarrier $S_1(f)$ to be removed from the optical input superchannel $S_{in}(f)$, such that the local oscillator input signal provides a local oscillator at frequency $f_{LO}$ for use by receiver 331. The output of receiver 331 is coupled to an input to DSP 335. It is noted that the other portion of optical transmit signal generated by tunable laser 370 and split by laser power splitter 372 is propagated toward I/Q modulator 339. In one embodiment, as described herein, receiver 331 may be implemented as a 90-degree optical hybrid and coherent receiver.

The A/D conversion element 361 receives the electronic input signal from receiver 331. The A/D conversion element 361 is configured to convert the electronic input signal from analog format to digital format. The electrically detected and digitized beat signal, denoted as x(t), has the form $x(t)=s'_{in}(t) \exp(j2\pi\Delta f + j\Delta\phi)$, where $s'_{in}(f)$ is a low-pass filtered version of optical input superchannel $S_{in}(t)$. It is noted that low-pass filtering can be provided in any suitable manner (e.g., inherently due to front-end bandwidth limitations, deliberately by means of one or more analog and/or digital filters, and the like). It is noted that digital filters can be implemented with very steep edges. It is further noted that the (randomly fluctuating) beat frequency between the subcarrier to be removed from the optical input superchannel $S_{in}(f)$ and the local oscillator provided by tunable laser 370 is given by $\Delta f = f_C - f_L$, and $\Delta\phi$ is a random phase offset between the two lasers (i.e., the remote laser which produced the optical input superchannel $S_{in}(f)$ and tunable laser 370 which produced the local oscillator input signal). The A/D conversion element 361 provides the signal x(t) to both the subcarrier demodulation element 362 and the subcarrier subtraction preparation element 363.

The subcarrier demodulation element 362 receives signal x(t) from A/D conversion element 361 and demodulates the signal x(t) to form thereby a decoded signal. The subcarrier demodulation element 362 may perform demodulation of signal x(t) using any suitable demodulation algorithm(s). The subcarrier demodulation element 362 provides the decoded signal to the subcarrier grooming interface 380. In this manner, the subcarrier to be removed from the optical input superchannel $S_{in}(f)$ is dropped from the optical input superchannel $S_{in}(f)$ for local use by subcarrier grooming apparatus 300 (e.g., for propagation via a different signal, for local processing of the data by subcarrier grooming apparatus 300, and the like, as well as various combinations thereof). In this manner, subcarrier grooming apparatus 300 is able to perform a typical optical drop operation, for dropping a portion of a received optical signal while allowing the remainder of the optical signal to continue to propagate along its path, at the subcarrier level such that subcarrier grooming apparatus 300 support optical signal grooming at the subcarrier level for optical superchannels. An exemplary system in which such an optical drop operation may be performed using a subcarrier grooming apparatus is depicted and described with respect to FIG. 5.

The subcarrier subtraction preparation element 363 receives signal x(t) from A/D conversion element 361 and prepares the signal x(t) for optical subtraction at the optical output coupler 340. In one embodiment, in which the optical input superchannel $S_{in}(f)$ is a Nyquist—WDM signal, subcarrier subtraction preparation element 363 may be a digital filter configured to perform steep narrow-band digital filtering for isolating the subcarrier to be removed from optical input superchannel $S_{in}(f)$. In one embodiment, in which the optical input superchannel $S_{in}(f)$ is an OFDM-based signal with significant spectral overlap between the individual subcarrier signals, subcarrier subtraction preparation element 363 may be configured to use OFDM subcarrier demodulation followed by subcarrier re-modulation techniques for isolating the subcarrier to be removed from optical input superchannel $S_{in}(f)$. The subcarrier subtraction preparation element 363 outputs subcarrier $S_1(f)$ to be removed from the optical input superchannel $S_{in}(f)$. The subcarrier subtraction preparation element 363 propagates the subcarrier $S_1(f)$ toward a subtraction input of electrical output coupler 366 (optionally, via delay element 364 and phase adjustment element 365, which are disposed between the output of subcarrier subtraction preparation element 363 and a subtraction input of electrical output coupler 366). The subtraction input of electrical output coupler 366 receives subcarrier $S_1(f)$ and, thus, the output of electrical output coupler 366 is indicative of subtraction of subcarrier $S_1(f)$ (i.e., indicative of $-S_1(f)$).

The DSP 335 optionally receives new data to be added to optical input superchannel $S_{in}(f)$. The new data is received by subcarrier modulation element 367 from the subcarrier grooming interface 380. The subcarrier modulation element 367 modulates the new data onto a new subcarrier (denoted as new subcarrier $S_N(f)$) to be added to optical input superchannel $S_{in}(f)$, thereby forming an encoded signal. The subcarrier modulation element 367 may perform modulation of the new data onto new subcarrier $S_N(f)$ using any suitable modulation algorithm(s). In one embodiment, since tunable laser 370 is used as both the local oscillator and the transmit laser (with an optional delay element 374 and/or an optional phase adjustment element 375 for enhanced optical correlation), the new data of the new subcarrier $S_N(f)$ is inserted at the same location as the subcarrier $S_1(f)$ to be removed (provided that the new subcarrier $S_N(f)$ is digitally modulated to a carrier frequency of $\Delta f$ prior to exiting DSP 335 (as indicated in the representation of the electronic output signal y(t) which is received by D/A conversion element 368). In one embodiment, new subcarrier $S_N(f)$ may be inserted at a different optical frequency, either within the slot from which the subcarrier $S_1(f)$ was dropped or within any other empty subcarrier slot, by digitally modulating new subcarrier $S_N(f)$ to the desired frequency offset $\Delta f$ relative to the frequency $f_{LO}$ of tunable laser 370. In this manner, the new data to be added to the optical input superchannel $s_{in}(t)$ is added to the optical input superchannel $s_{in}(t)$ by subcarrier grooming apparatus 300 for propagation downstream via the optical output signal path 350. The subcarrier modulation element 367 propagates the new subcarrier $S_N(f)$ toward an addition input of electrical output coupler 366. The addition input of electrical output coupler 366 receives new subcarrier $S_N(f)$ and, thus, the output of electrical output coupler 366 is indicative of addition of new subcarrier $S_N(f)$. In this manner, subcarrier grooming apparatus 300 is able to perform a optical add operation, for adding new data to received optical signal while allowing the received optical signal to continue to propagate along its path, at the subcarrier level such that subcarrier grooming apparatus 300 supports optical signal grooming at the subcarrier level for optical superchannels. An exemplary system in which such an optical add operation may be performed using a subcarrier grooming apparatus is depicted and described with respect to FIG. 5.

As described above, electrical output coupler 366 receives subcarrier $S_1(f)$ at its subtraction input and, optionally, receives new subcarrier $S_N(f)$ at its addition input. The electrical output coupler 366 outputs an electronic output signal y(t) which may have the form: (1) $y(t)=[-s_1(t)] \exp(j2\pi\Delta f)$, in the case in which a new subcarrier $S_N(f)$ is not added to the optical input superchannel $S_{in}(f)$, or (2) $[s_N(t)-s_1(t)] \exp(j2\pi\Delta f)$, in the case in which a new subcarrier $S_N(f)$ is added to the optical input superchannel $S_{in}(f)$. The electrical output coupler 366 provides the electronic output signal y(t) to D/A conversion element 368.

The D/A conversion element 368 receives the electronic output signal from electrical output coupler 366. The D/A conversion element 368 is configured to convert the electronic output signal from digital format to analog format. The D/A conversion element 368 provides the analog electronic output signal to I/Q modulator 339.

The I/Q modulator 339 receives the analog electronic output signal from D/A conversion element 368. The I/Q modulator 339 I/Q modulates the analog electronic output signal to form the processed optical output signal. The I/Q modulator 339 provides the processed optical output signal to the optical output coupler 340.

As noted above, the optical output coupler 340 is configured to receive the optical input signal propagating via optical signal path $330_O$ and the processed optical output signal received via the optoelectronic signal path $330_{OE}$, and to combine the optical input signal and the processed optical output signal to form thereby the optical output superchannel $S_{out}(f)$ which then propagates via optical output signal path 350. The optical input signal propagating via optical signal path $230_O$ includes the subcarrier $S_1(f)$ to be removed from the optical input signal and the processed optical output signal received via the optoelectronic signal path $230_{OE}$ includes an indication of subtraction of the subcarrier $S_1(f)$ to be removed from the optical input signal, such that interaction of the two signals within optical output coupler 340 results in removal of subcarrier $S_1(f)$ from the optical input superchannel $S_{in}(f)$ via destructive interference between the two signals (thereby resulting in an available slot within optical output superchannel $S_{out}(f)$ where the subcarrier $S_1(f)$ would otherwise have been present). The processed optical output signal received via the optoelectronic signal path $330_{OE}$ optionally includes an indication of addition of a new subcarrier $S_N(f)$ such that interaction of the two signals within optical output coupler 340 results in addition of new subcarrier $S_N(f)$ to the optical input superchannel $S_{in}(f)$ (thereby resulting in presence of new subcarrier $S_N(f)$ within optical output superchannel $S_{out}(f)$ where the subcarrier $S_1(f)$ would otherwise have been present). The resulting optical output superchannel $S_{out}(f)$ (with the subcarrier $S_1(f)$ removed and, optionally, including new subcarrier $S_N(f)$) is output from optical output coupler 340 and propagates via optical output signal path 350. It is noted that the interaction between the signals at optical output coupler 340 may be improved through use of one or more delay elements and/or one or more phase adjustment elements.

In one embodiment, one or more delay elements are configured to ensure that the subcarrier $S_1(f)$ processed by DSP 335 in the optoelectronic signal path $330_{OE}$ destructively interferes with its equivalent subcarrier $S_1(f)$ of optical input superchannel $S_{in}(f)$ that is propagating in the optical signal path $330_O$. In one embodiment, for example, delay element 314 (denoted as delay A) and/or delay element 364 (denoted as delay C) may be configured to imparts delay such that the optical input superchannel $S_{in}(f)$ propagating via the optical signal path $330_O$ is substantially temporally aligned with the processed optical output signal received at optical output coupler 340 via optoelectronic signal path $330_{OE}$, thereby leading to cancellation of subcarrier $S_1(f)$ from the optical input superchannel $S_{in}(f)$. The delay element 314 may be a fixed or tunable optical delay element. The delay element 364 may be a fixed or tunable digital delay element.

In one embodiment, the delay imparted by delay element 314 may be configured to be large enough such that it is equal to or greater than any expected or possible processing delay along the optoelectronic signal path $330_{OE}$ (e.g., and the delay imparted by delay element 364 may then be controlled to ensure substantial temporal alignment of the optical signals at optical output coupler 340. For example, a 2000-symbol processing delay at 38 GBaud corresponds to use of approximately 8 meters of fiber for delay element 314.

In one embodiment, the delay element 364 is configured to impart delay to the signal that is propagating via the optoelectronic signal path $330_{OE}$, such that the optical input superchannel $S_{in}(f)$ propagating via the optical signal path $330_O$ is substantially temporally aligned with the processed optical output signal received at optical output coupler 340 via optoelectronic signal path $330_{OE}$. In one embodiment, in which delay element 334 is a dynamically controllable delay element, the amount of delay imparted by delay element 334 may be controlled by using the control detector 390 to measure certain properties of the optical output superchannel $S_{out}(f)$ and impart a delay for ensuring that the optical input superchannel $S_{in}(f)$ propagating via the optical signal path $330_O$ is temporally aligned with the processed optical output signal received at optical output coupler 340 via optoelectronic signal path $330_{OE}$.

It is noted that either or both of delay elements 314 and 364 may be configured to operate in a manner similar to delay elements $236_O$ and $236_{OE}$ of optoelectronic interferometer 200 of FIG. 2, respectively.

In one embodiment, in the presence of optical phase drifts, one or more phase adjustment elements are configured to ensure that the subcarrier $S_1(f)$ processed by DSP 335 in the optoelectronic signal path $330_{OE}$ destructively interferes with its equivalent subcarrier $S_1(f)$ of optical input superchannel $S_{in}(f)$ that is propagating in the optical signal path $330_O$.

In one embodiment, for example, in the presence of optical phase drifts, phase adjustment element 315 (disposed in the optical signal path $330_O$) and/or phase adjustment element 365 (disposed in the optoelectronic signal path $330_{OE}$) may be configured to perform phase adjustments such that the optical input superchannel $S_{in}(f)$ propagating via the optical signal path $330_O$ is phase-aligned with the processed optical output signal received at optical output coupler 340 via optoelectronic signal path $330_{OE}$ thereby leading to cancellation of subcarrier $S_1(f)$ from the optical input superchannel $S_{in}(f)$.

In one embodiment, the phase adjustment element 315 and/or the phase adjustment element 335 may be controlled, using a control signal from control detector 390, where the control detector 390 is configured to (1) use pilot subcarriers in an OFDM aggregate signal, (2) use temporal pilot symbols, or (3) feed the detected optical output signal back into the DSP 335 for comparison with an expected optical output signal at that point while adjusting the phase of the optical input signal propagating via the optical signal path $230_O$ to drive an error signal toward zero.

It is noted that either or both of phase adjustment elements 315 and 365 may be configured to operate in a manner similar to phase adjustment elements $237_O$ and $237_{OE}$ of the optoelectronic interferometer 200 of FIG. 2, respectively.

As noted above, tunable laser 370 may be used as both the local oscillator (for tracking the frequency of subcarrier $S_1(f)$ to be removed from the optical input superchannel $S_{in}(f)$ and for providing the frequency of the new subcarrier $S_N(f)$ to be added to the optical input superchannel $S_{in}(f)$). The output of tunable laser 370 is provided to laser power splitter 372, which splits the optical transmit signal, providing a portion of the optical transmit signal to the receiver 331 (for use as the local oscillator) and propagating a portion of the optical transmit signal toward I/Q modulator 339 (for use as the frequency of the new subcarrier $S_N(f)$). In one embodiment, the delay element 374 is disposed between the laser power splitter 372 and I/Q modulator 339 (e.g., for use alone and/or in combination with delay element 314 and/or delay element 334 for enhanced optical correlation), ensuring that (re)modulation takes place at I/Q modulator 239 using the same optical laser field used for coherent detection by receiver 331, including its random fluctuations in amplitude, frequency, and/or phase, thereby cancelling any such randomness. In one embodiment, the phase adjustment element 375 is disposed between the laser power splitter 372 and I/Q modulator 339 (e.g., for use alone and/or in combination with phase adjustment element 315 and/or phase adjustment element 335) for enhanced optical correlation, ensuring that (re)modulation takes place at I/Q modulator 239 using the same optical laser field used for coherent detection by receiver 331, including its random fluctuations in amplitude, frequency, and/or phase, thereby cancelling any such randomness. In one embodiment, delay element 374 and/or phase adjustment element 375 may be placed between the I/Q modulator 339 and output coupler 340 (omitted for purposes of clarity). In one embodiment, optical attenuator 376, disposed either between the laser power splitter 372 and I/Q modulator 339 (as depicted in FIG. 3) or between I/Q modulator 339 and output coupler 140 (omitted from FIG. 3 for purposes of clarity), may be used to equalize the power of the subcarrier $S_1(f)$ being removed from the optical input superchannel $S_{in}(f)$ and the optical power of the new subcarrier $S_N(f)$ being added to optical input superchannel $S_{in}(f)$, thereby improving the efficiency of the destructive interference that takes place within the optical output coupler 340 of optoelectronic interferometer 300. It is noted that, in at least one embodiment, equivalent functionality may be achieved by digitally reducing the drive amplitude of I/Q modulator 339 as part of DSP 335.

It is noted that the optoelectronic signal path $330_{OE}$ only needs to support the bandwidth(s) of the subcarrier(s) to be dropped (and, optionally, added) to the optical input superchannel $S_{in}(f)$, not the bandwidth of the entire optical input superchannel $S_{in}(f)$ as would be required in the absence of the various embodiments of interferometer 300.

Although primarily depicted and described herein with respect to optoelectronic interferometer embodiments configured to support single polarization optical signals, it is noted that various optoelectronic interferometer embodiments may be configured to support polarization multiplexed optical signals as well as spatially multiplexed optical signals.

In one embodiment, for example, in order to provide an optoelectronic interferometer configured to support dual-polarization optical signals, the input optical coupler and output optical coupler (and, where present, the delay element provided in the optical path) may be implemented as polarizing couplers in order to realize a polarization diversity setup.

In one embodiment, for example, in order to provide an optoelectronic interferometer configured to support dual-polarization optical signals, the electronic processing module may be configured to include a polarization-rotating element (e.g., using a 2×2 matrix with scalar elements for the different polarizations). An exemplary embodiment is depicted and described in FIG. 4.

Figure 4:
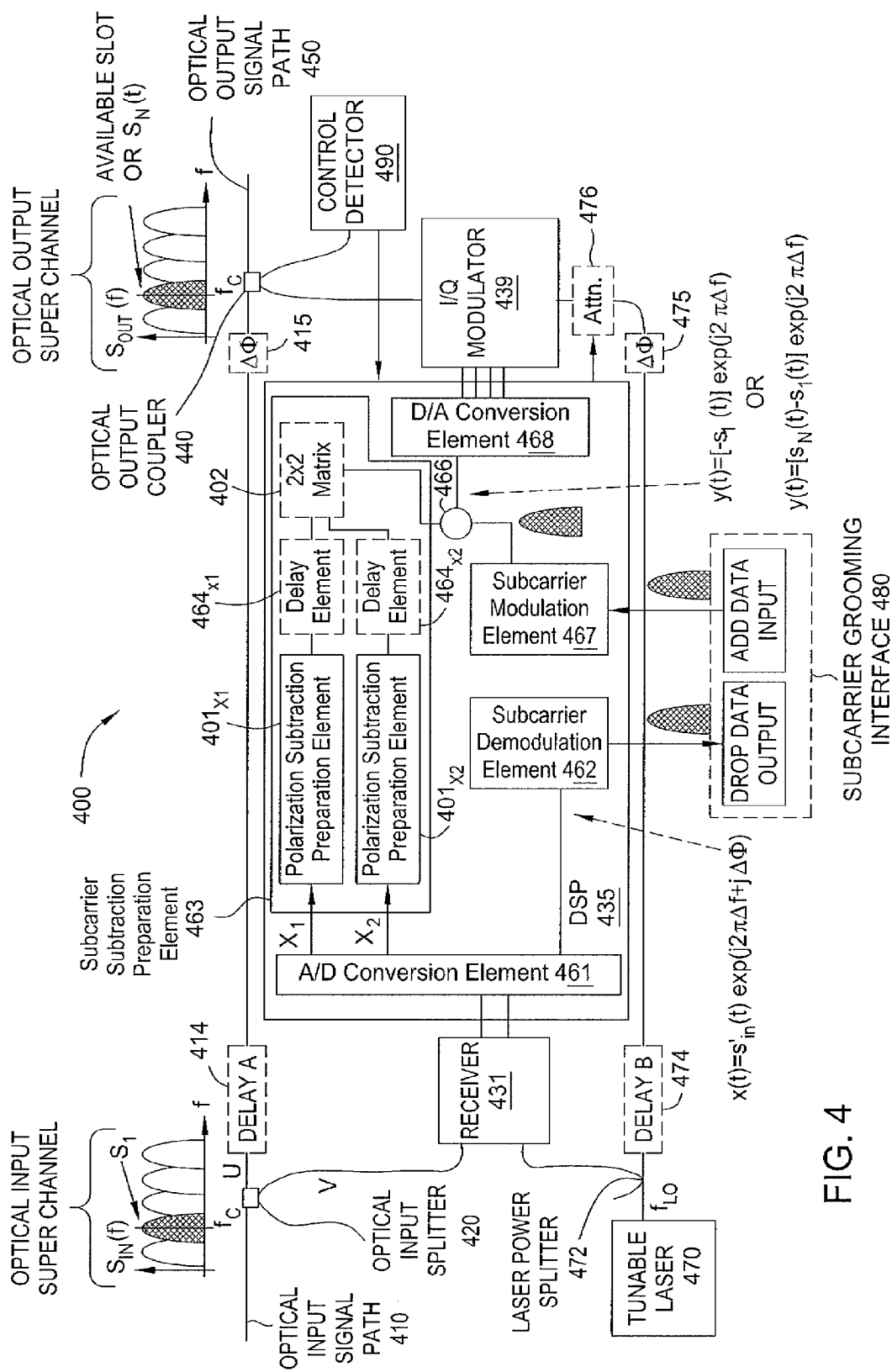
FIG. 4 depicts an exemplary subcarrier grooming apparatus, using an optoelectronic interferometer as depicted in FIG. 2, configured to support dual-polarization optical signals.

FIG. 4 depicts an exemplary subcarrier grooming apparatus, using an optoelectronic interferometer as depicted in FIG. 2, configured to support dual-polarization optical signals.

As depicted in FIG. 4, optoelectronic interferometer 400 of FIG. 4 is similar to the optoelectronic interferometer 300 of FIG. 3. It is noted that similar reference numbers have been used to denote similar elements in FIG. 2 and FIG. 3. It is further noted that any differences between elements with similar reference numbers may come from the difference between elements of optoelectronic interferometer 300 of FIG. 3 supporting single polarization optical signals and elements of optoelectronic interferometer 400 of FIG. 4 supporting dual-polarization optical signals. For example, optical input signal path 410 of FIG. 4 is similar to optical signal input path 310 of FIG. 3, with optical input signal path 410 being configured to support propagation of dual-polarization optical signals while optical input signal path 310 is configured to support propagation of single polarization optical signals. Similarly, for example, the receiver 431 of FIG. 4 is similar to the receiver 331 of FIG. 3, with the receiver 431 being configured to receive and detect dual-polarization optical signals while receiver 331 is configured to receive and detect single polarization optical signals. From the foregoing examples, it will be appreciated that for each of the elements of FIG. 3 and FIG. 4 having similar reference numbers, the primary difference between the corresponding elements, unless otherwise noted, is the difference between supporting single polarization optical signals (as in the embodiment of FIG. 3) and supporting dual-polarization optical signals (as in the embodiment of FIG. 4), which may or may not result in structural and/or functional differences between the corresponding elements, respectively. It is noted that additional differences between the embodiment FIG. 4 and the embodiment of FIG. 3 are described in additional detail below.

The subcarrier subtraction preparation element 463 receives first polarization signal $x_1(t)$ and second polarization signal $x_2(t)$ from the A/D conversion element 461 and prepares the first polarization signal $x_1(t)$ and the second polarization signal $x_2(t)$ for optical subtraction at the optical output coupler 440. It is noted that, for each polarization signal $x_i(t)$ received at subcarrier subtraction preparation element 463, the subcarrier subtraction preparation element 463 is configured to prepare that polarization signal $x_i(t)$ for optical subtraction at the optical output coupler 440 using processing similar to that provided by subcarrier subtraction preparation element 363 of FIG. 3.

The subcarrier subtraction preparation element 463 includes (1) a first polarization subtraction preparation element $401_{x1}$ that is configured to receive the first polarization signal $x_1(t)$ and prepare the first polarization signal $x_1(t)$ for optical subtraction at the optical output coupler 440 and (2) a second polarization subtraction preparation element $401_{x2}$ that is configured to receive the second polarization signal $x_2(t)$ and prepare the second polarization signal $x_2(t)$ for optical subtraction at the optical output coupler 440.

The subcarrier subtraction preparation element 463 also may include a 2×2 matrix 402 configured to receive the signals output by the first polarization subtraction preparation element $401_{x1}$ and the second polarization subtraction preparation element $401_{x2}$, combine the polarization components, and propagate the resulting signal to the subtraction input of electrical output coupler 466.

In one embodiment, a delay element $464_{x1}$ may be disposed between first polarization subtraction preparation element $401_{x1}$ and 2×2 matrix 402 (similar to delay element 364 of FIG. 3) for imparting delay associated with the first polarization signal $x_1(t)$ and/or a delay element $464_{x2}$ may be disposed between second polarization subtraction preparation element $401_{x2}$ and 2×2 matrix 402 (again, similar to delay element 364 of FIG. 3) for imparting delay associated with the second polarization signal $x_2(t)$.

The output of the 2×2 matrix is provided to the subtraction input of electrical output coupler 466.

In this manner, a subcarrier grooming apparatus may be configured to support dual-polarization optical signals.

It is noted that the more general optoelectronic interferometer of FIG. 2 may be configured to support single-polarization and dual-polarization optical signals.

Although primarily depicted and described herein with respect to embodiments of an optoelectronic interferometer configured to operate on an optical signal having relatively closely-spaced subcarriers (e.g., overlapping, nearly overlapping, or relatively small inter-subcarrier space), it is noted that an optoelectronic interferometer may be configured to operate on an optical signal having relatively widely-separated subcarriers. It is noted that such subcarriers may even be considered independent carriers of a multiplex of WDM channels. Although primarily depicted and described herein with respect to embodiments of an optoelectronic interferometer configured to operate on a single subcarrier, it is noted that an optoelectronic interferometer may be configured to operate on multiple subcarriers. It is noted that combinations of such embodiments may be used. In one embodiment, for example, if multiple spectrally widely-separated subcarriers need to be extracted or otherwise operated on, the exemplary optoelectronic interferometers depicted and described herein may be augmented to support such a capability (e.g., by adding more optical input splitters/couplers to the input/output of the optical signal path, by adding more optical splitters into the optoelectronic signal path as well as to the modulated line before the optical output coupler, and the like).

Although primarily depicted and described herein with respect to embodiments in which a single optoelectronic interferometer is used to operate on one or more subcarriers, it is noted that any suitable number of optoelectronic interferometers may be used, in any suitable arrangement, to operate on any suitable number of subcarriers. For example, an apparatus may include one or more optoelectronic interferometers configured to operate on any suitable number of subcarriers.

Figure 5:
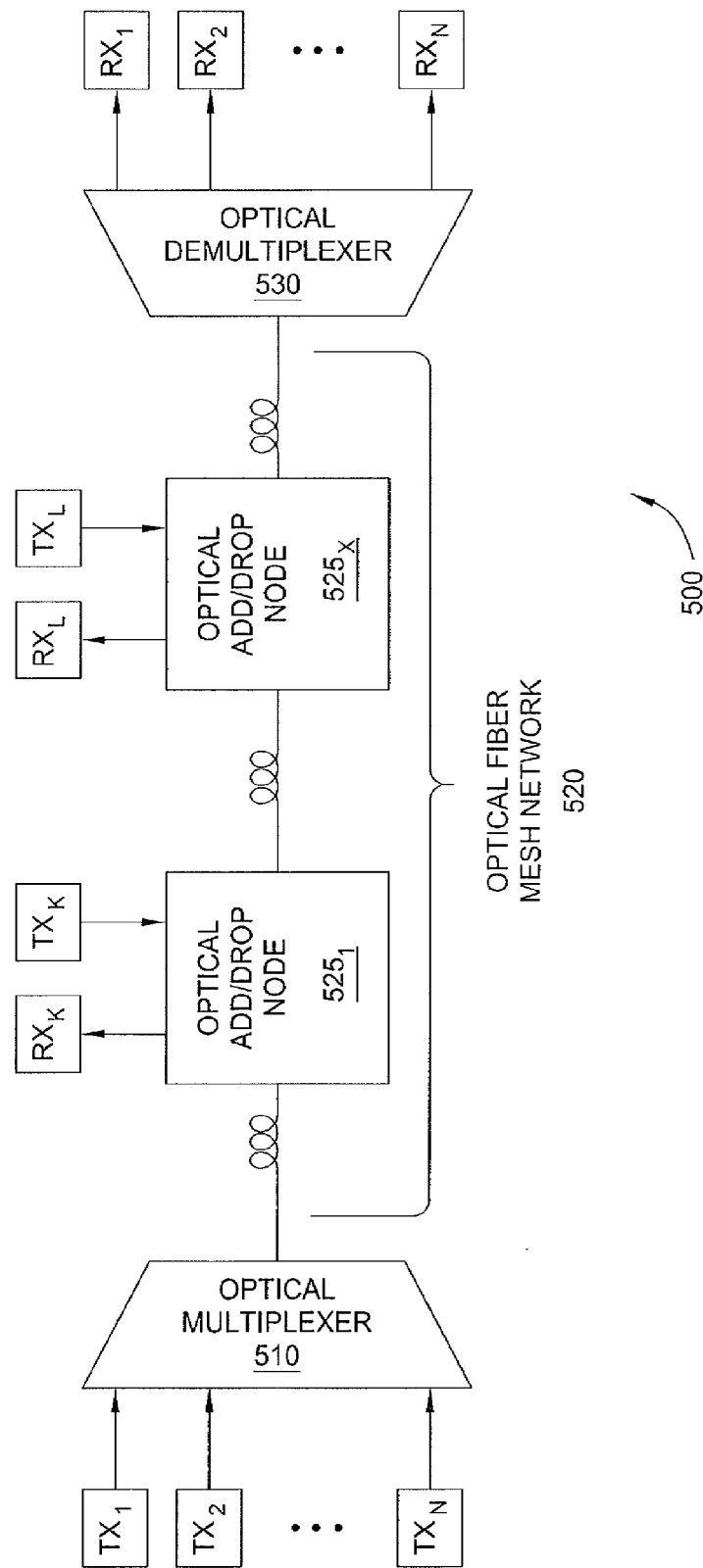
FIG. 5 depicts an exemplary system including an interferometer according to at least one embodiment.

FIG. 5 depicts an exemplary system including an interferometer according to at least one embodiment.

As depicted in FIG. 5, system 500 is an optical communications system including an optical multiplexer 510, an optical fiber mesh network 520 having disposed therein one or more optical add/drop nodes 525 (illustratively, depicted as optical add/drop nodes $525_1$ and optical add/drop node $525_X$), and an optical demultiplexer 530.

As depicted in FIG. 5, the optical multiplexer 510 receives a plurality of single-carrier or multi-carrier optical transmit signals (denoted as $TX_1$ through $TX_N$), multiplexes the optical transmit signals, and outputs the resulting multiplexed optical signal into optical fiber mesh network 520.

As depicted in FIG. 5, each optical add/drop node 525 receives the multiplexed optical signal propagating via the optical fiber mesh network 520 and outputs an associated multiplexed optical signal into optical fiber mesh network 520. The optical add/drop node 525 is configured to perform optical signal grooming, for dropping one or more portions of the multiplexed optical signal received at the optical add/drop node 525 (indicated by $RX_i$) and/or for adding one or more new portions to the multiplexed optical signal received at the optical add/drop node 525 (indicated by $TX_i$), to form thereby the associated multiplexed optical signal output by optical add/drop node 525. It is noted that such signal portions may be added and/or dropped on the basis of single and/or multiple optical carriers and/or on the basis of single and/or multiple optical subcarriers. In one embodiment, optical add/drop node 525 includes an interferometer as depicted and described herein. In one embodiment, for example, the optical add/drop node 525 includes interferometer 100 depicted and described with respect to FIG. 1. In one embodiment, for example, the optical add/drop node 525 includes optoelectronic interferometer 200 depicted and described with respect to FIG. 2. In one embodiment, for example, the optical add/drop node 525 includes one of the exemplary subcarrier grooming apparatuses of FIG. 3 or FIG. 4.

As depicted in FIG. 5, the optical demultiplexer 530 receives the multiplexed optical signal propagating via optical fiber mesh network 520, demultiplexes the multiplexed optical signal output to recover a plurality of optical receive signals (denoted as $RX_1$ through $RX_N$), and outputs the receive signals.

Although primarily depicted and described with respect to use of an exemplary interferometer within a particular type of system (illustratively, within an optical communications system), it will be appreciated that various embodiments of interferometers depicted and described herein may be used within various other types of systems, where the use within such other types of systems may be dependent, at least in part, on the application for which the interferometer is being used, the type of signal(s) for which the interferometer is being used, and the like, as well as various combinations thereof.

Figure 6:
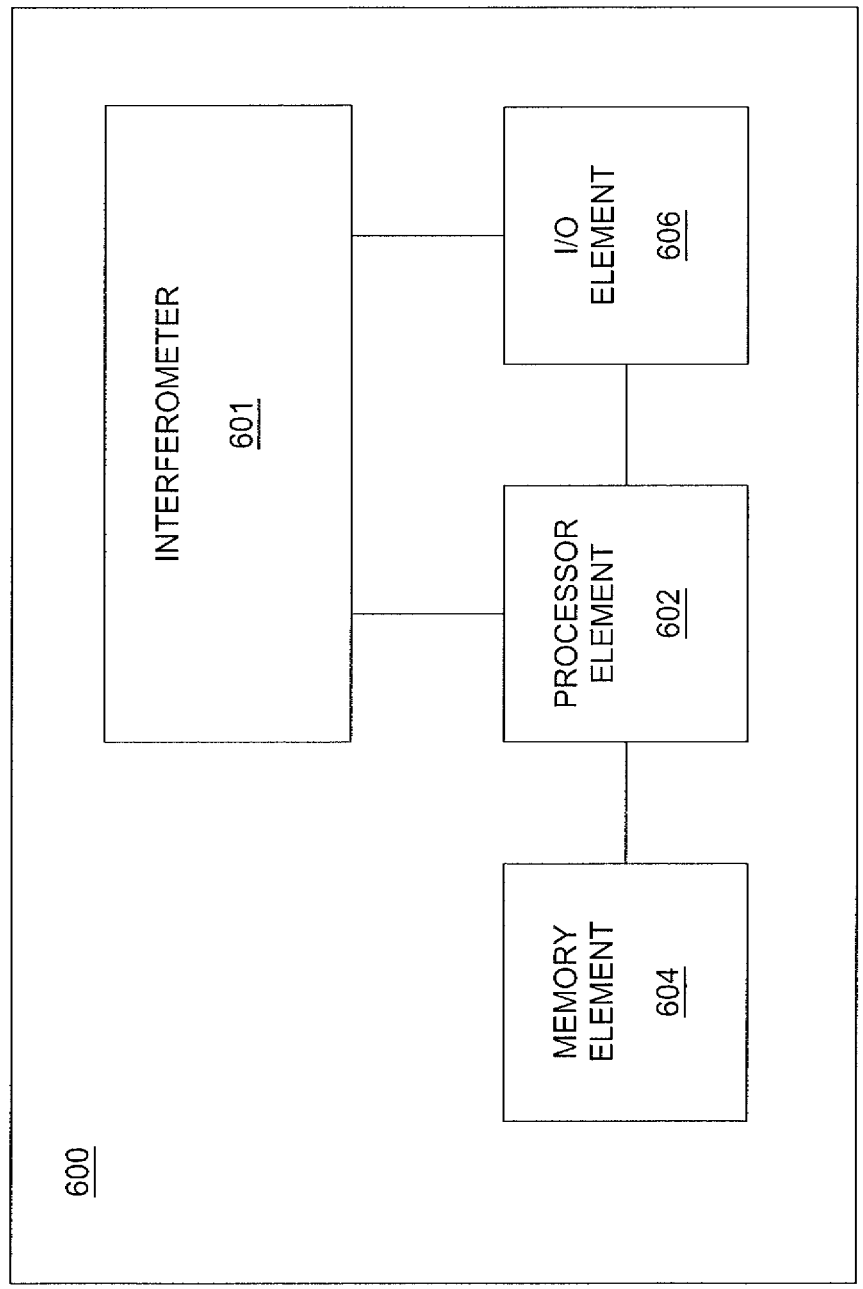
FIG. 6 depicts an exemplary apparatus including an interferometer according to at least one embodiment.

FIG. 6 depicts an exemplary apparatus including an interferometer according to at least one embodiment.

As depicted in FIG. 6, apparatus 600 includes an interferometer 601. The apparatus 600 also may include one or more of at least one processor element 602, at least one memory 604, and at least one input/output element 606. The at least one processor element 602 may be any conventional processor for executing programs stored in memory. The at least one memory 604 may be any conventional volatile memory (e.g., RAM, DRAM, among others), non-volatile memory (e.g., disk drives, floppy drives, CDROM, EPROMS, among other computer readable medium) or any other conventional memory device for storing data and various control programs. The at least one input/output element 606 may include one or more of an input interface, a receiver, a transmitter, an output interface, interface circuitry for enabling communication between components of apparatus 600, and the like.

Figure 7:
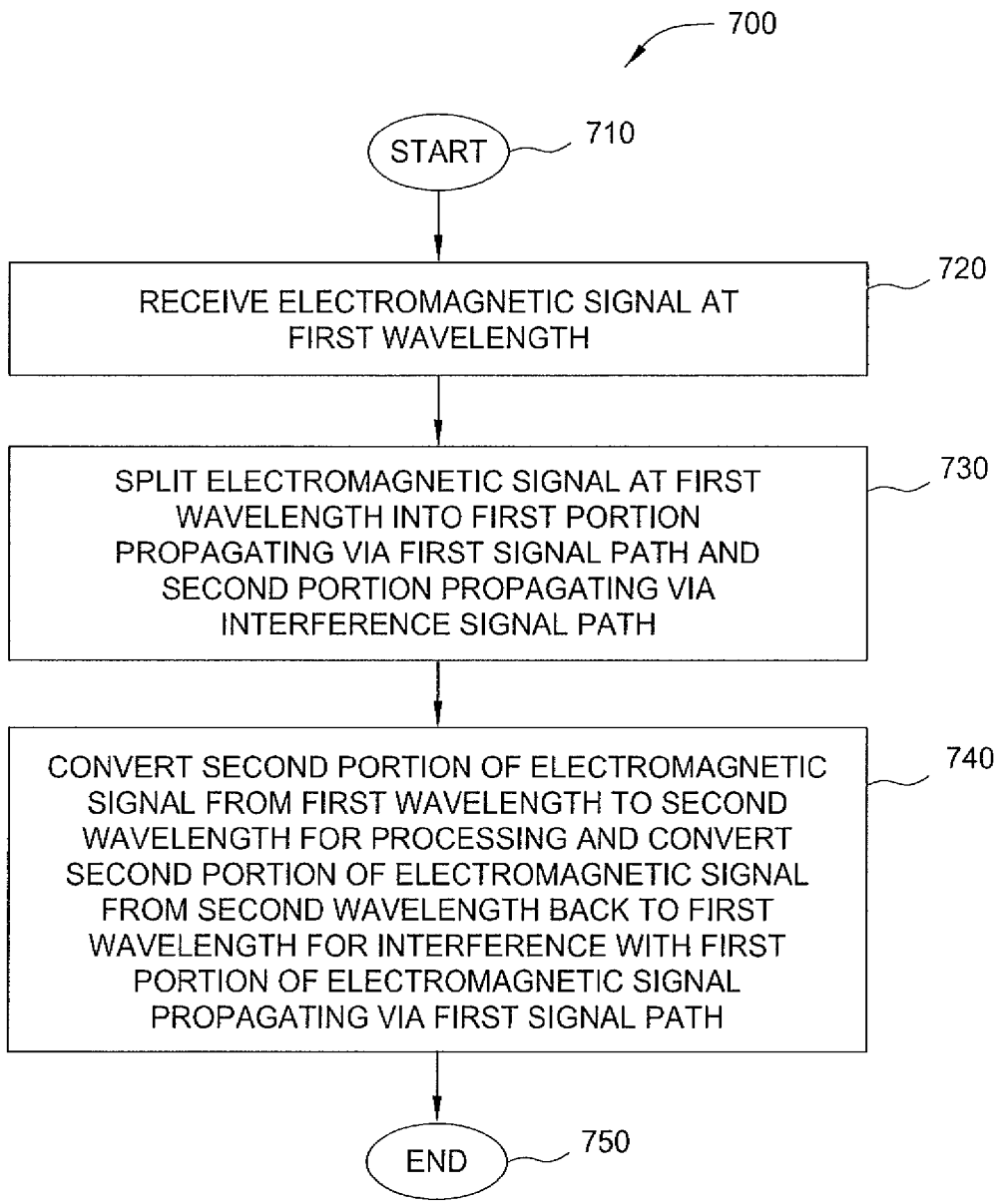
FIG. 7 depicts an exemplary method for using an interferometer according to at least one embodiment.

FIG. 7 depicts an exemplary method for using an interferometer according to at least one embodiment. At step 710, method 700 begins. At step 720, an electromagnetic signal at a first wavelength is received. At step 730, the electromagnetic signal at the first wavelength is split into a first portion which is propagated via a first signal path and a second portion which is propagated via an interference signal path. At step 740, the second portion of the electromagnetic signal is converted from the first wavelength to a second wavelength for processing and is converted back from the second wavelength to the first wavelength for interference with the first portion of the electromagnetic signal propagating via the first signal path. At step 750, method 700 ends. It will be appreciated that although depicted and described as ending (for purposes of clarity), various other steps may be performed in conjunction with method 700 of FIG. 7.

It will be appreciated that at least some of the functions depicted and described herein may be implemented in software (e.g., via implementation of software on one or more processors) in conjunction with associated hardware and/or in hardware (e.g., using a general purpose computer, one or more application specific integrated circuits (ASIC), and/or any other hardware equivalents).

It will be appreciated that at least some of the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

It is contemplated that at least some of the functions and/or elements discussed herein as being implemented within software may be implemented within hardware. It is contemplated that at least some of the functions and/or elements described herein may be implemented as a computer program product wherein computer instructions, when processed by a computer, adapt the operation of the computer such that the functions described herein are invoked or otherwise provided. Instructions for invoking functions described herein may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An interferometer, comprising:
   a first path configured to propagate an electro-magnetic signal at a first wavelength; and
   an interference path configured to convert a portion of the electro-magnetic signal from the first wavelength to a second wavelength, to convert the portion of the electro-magnetic signal from the second wavelength back to the first wavelength, and to interfere the electro-magnetic signal of the first path with the portion of the electro-magnetic signal converted back to the first wavelength, wherein the second wavelength is non-baseband.

2. The interferometer of claim 1, wherein the first wavelength is an optical wavelength.

3. The interferometer of claim 1, wherein the electro-magnetic signal is an optical frequency multiplex comprising a plurality of signals at different optical carrier frequencies.

4. The interferometer of claim 1, wherein the second wavelength is an optical wavelength.

5. The interferometer of claim 1, wherein the electro-magnetic signal is a frequency multiplex signal comprising a plurality of frequencies.

6. The interferometer of claim 5, wherein the interference path is configured to produce destructive interference adapted to eliminate one or more of the frequencies.

7. The interferometer of claim 5, wherein the interference path is configured to produce a new signal that adds constructively to the electromagnetic signal at an output coupler of the interferometer.

8. The interferometer of claim 1, further comprising:
   an input splitter coupled to the first path and to the interference path, the input splitter configured to split an input signal at the first wavelength for propagation via the first path and the interference path.

9. The interferometer of claim 1, wherein the first path is configured to process the electro-magnetic signal at the first wavelength.

10. The interferometer of claim 1, wherein the first path comprises:
    a delay element configured to impart a delay to the electro-magnetic signal at the first wavelength.

11. The interferometer of claim 1, wherein the first path comprises:
    a phase adjustment element configured to adjust a phase of the electro-magnetic signal at the first wavelength.

12. The interferometer of claim 1, wherein the interference path is configured to process the portion of the electro-magnetic signal at the second wavelength.

13. The interferometer of claim 1, wherein the interference path comprises:
    a first wavelength conversion element configured to convert the portion of the electro-magnetic signal from the first wavelength to the second wavelength;
    a processing element configured to perform processing on the portion of the electro-magnetic signal at the second wavelength; and
    a second wavelength conversion element configured to convert the portion of the electro-magnetic signal from the second wavelength back to the first wavelength.

14. The interferometer of claim 1, wherein the interference path comprises:
    a processing element configured to perform signal grooming.

15. The interferometer of claim 1, wherein the interference path comprises:
    a delay element configured to impart a delay to the portion of the electro-magnetic signal at the second wavelength.

16. The interferometer of claim 1, wherein the interference path comprises:
    a phase adjustment element configured to adjust a phase of the portion of the electro-magnetic signal at the second wavelength.

17. The interferometer of claim 1, wherein the interference path comprises:
    a filtering element configured to operate on the portion of the electro-magnetic signal at the second wavelength.

18. The interferometer of claim 1, further comprising:
    a delay element configured to be tuned to provide substantially equal delays in the first path and the interference path.

19. The interferometer of claim 1, further comprising:
    a phase adjustment element configured to be tuned to provide an interference property at an output coupler of the interferometer.

20. The interferometer of claim 1, further comprising:
    an output coupler coupled to the first path and to the interference path, the output coupler configured to combine the electro-magnetic signal at the first wavelength from the first path and the portion of the electro-magnetic signal at the first wavelength from the interference path.

21. An apparatus, comprising:
    an interferometer comprising:
    a first path configured to propagate an electro-magnetic signal at a first wavelength; and
    an interference path configured to convert a portion of the electro-magnetic signal from the first wavelength to a second wavelength, to convert the portion of the electro-magnetic signal from the second wavelength back to the first wavelength, and to interfere the electro-magnetic signal of the first path with the portion of the electro-magnetic signal converted back to the first wavelength, wherein the second wavelength is non-baseband.

22. An optical transmission system, comprising:
    an interferometer comprising:
    a first path configured to propagate an electro-magnetic signal at a first wavelength; and
    an interference path configured to convert a portion of the electro-magnetic signal from the first wavelength to a second wavelength, to convert the portion of the electro-magnetic signal from the second wavelength back to the first wavelength, and to interfere the electro-magnetic signal of the first path with the portion of the electro-magnetic signal converted back to the first wavelength, wherein the second wavelength is non-baseband.

* * * * *